US009927306B2

(12) United States Patent
Haber et al.

(10) Patent No.: US 9,927,306 B2
(45) Date of Patent: Mar. 27, 2018

(54) APPARATUS AND METHOD FOR MONITORING FUEL OIL DELIVERY

(71) Applicants: Greg Haber, Woodbury, NY (US); Craig Kirsch, Woodbury, NY (US)

(72) Inventors: Greg Haber, Woodbury, NY (US); Craig Kirsch, Woodbury, NY (US)

( * ) Notice: Subject to any disclaimer, the term of this patent is extended or adjusted under 35 U.S.C. 154(b) by 136 days.

(21) Appl. No.: 15/040,531

(22) Filed: Feb. 10, 2016

(65) Prior Publication Data
US 2016/0216146 A1    Jul. 28, 2016

Related U.S. Application Data

(63) Continuation-in-part of application No. 14/665,507, filed on Mar. 23, 2015.

(60) Provisional application No. 61/970,156, filed on Mar. 25, 2014.

(51) Int. Cl.
*G01K 13/02* (2006.01)
*B67D 7/04* (2010.01)
*B67D 7/08* (2010.01)
*B67D 7/30* (2010.01)

(52) U.S. Cl.
CPC .............. *G01K 13/02* (2013.01); *B67D 7/04* (2013.01); *B67D 7/08* (2013.01); *B67D 7/303* (2013.01); *G01K 2013/026* (2013.01)

(58) Field of Classification Search
CPC .. B67D 7/08; B67D 7/303; G01K 3/02; G01F 7/00
See application file for complete search history.

(56) References Cited

U.S. PATENT DOCUMENTS

| 3,990,305 A * | 11/1976 | Wallman .................. G01F 1/115 73/861.02 |
| 4,101,056 A * | 7/1978 | Mattimoe ............... B67D 7/228 222/1 |
| 4,551,719 A * | 11/1985 | Carlin ...................... B67D 7/32 340/3.32 |
| 4,876,530 A * | 10/1989 | Hill ......................... G01M 3/16 340/605 |
| 5,216,409 A * | 6/1993 | Ament ................ B60R 16/0232 123/575 |
| 5,287,752 A * | 2/1994 | Den Boer ................. G01F 1/64 73/861.04 |

(Continued)

*Primary Examiner* — John Fitzgerald
(74) *Attorney, Agent, or Firm* — Epstein Drangel LLP; Robert L. Epstein

(57) ABSTRACT

The apparatus for monitoring the delivery of fuel oil through a fuel oil delivery pipe including a flow meter and property sensor associated with the oil delivery pipe for measuring the flow rate, temperature, viscosity, density and dielectric constant of the fuel oil as it moves through the delivery pipe. The digital output signals from the flow meter and property sensor are used to generate data signals which are a function of the measured parameters. A memory records the data signals. The actual total quantity of fuel oil delivered through the pipe is calculated based upon the data signals. A clock circuit generates a timing signal reflecting the date and time the measurements were taken. A transmission signal formed of the calculated actual total quantity of fuel oil delivered and time signal may be sent to a remote location by a WiFi transmitter or through the internet using a modem.

16 Claims, 3 Drawing Sheets

(56) References Cited

U.S. PATENT DOCUMENTS

| | | | | |
|---|---|---|---|---|
| 5,599,460 | A * | 2/1997 | Van Schoiack | B01D 17/10 184/108 |
| 5,936,156 | A * | 8/1999 | Roberts | G01F 1/684 73/202.5 |
| 6,397,686 | B1 * | 6/2002 | Taivalkoski | B67D 7/20 73/861.78 |
| 6,553,812 | B2 * | 4/2003 | Park | G01N 11/08 324/663 |
| 6,575,206 | B2 * | 6/2003 | Struthers | B67D 7/32 137/312 |
| 6,651,517 | B1 * | 11/2003 | Olivier | B67D 7/20 222/23 |
| 6,708,571 | B1 * | 3/2004 | Hopfe | G01F 15/02 73/861.79 |
| 6,796,173 | B1 * | 9/2004 | Lajoie | G01F 3/10 73/261 |
| 6,945,125 | B2 * | 9/2005 | Vanderah | G01F 3/10 73/861.77 |
| 7,028,561 | B2 * | 4/2006 | Robertson | B67D 7/085 222/52 |
| 7,366,621 | B2 * | 4/2008 | Sprague | G01F 1/3209 366/17 |
| 7,454,985 | B2 * | 11/2008 | Marioni | F04D 15/0088 318/717 |
| 7,602,671 | B2 * | 10/2009 | Dionysiou | G01F 23/2962 367/112 |
| 2005/0028610 | A1 * | 2/2005 | Olivier | B67D 7/20 73/861.79 |
| 2005/0120806 | A1 * | 6/2005 | Vanderah | G01F 3/10 73/861.77 |
| 2006/0016243 | A1 * | 1/2006 | Nevius | G01F 1/66 73/1.16 |
| 2009/0016164 | A1 * | 1/2009 | Dionysiou | G01F 23/2962 367/108 |
| 2010/0000334 | A1 * | 1/2010 | Katsurada | G01F 1/8422 73/861.357 |
| 2010/0109331 | A1 * | 5/2010 | Hedtke | G05B 23/0256 290/54 |
| 2010/0132431 | A1 * | 6/2010 | Hernandez | G01N 33/2852 73/1.06 |
| 2012/0185197 | A1 * | 7/2012 | Lorden | G01F 9/001 702/100 |
| 2015/0276452 | A1 * | 10/2015 | Haber | G01F 7/00 73/197 |

* cited by examiner

APPARATUS AND METHOD FOR MONITORING FUEL OIL DELIVERY

CROSS-REFERENCE TO RELATED APPLICATIONS

This application is a continuation-in-part of U.S. patent application Ser. No. 14/665,507, filed Mar. 23, 2015, which claims priority on Provisional Patent Application Ser. No. 61/970,156, filed Mar. 25, 2014.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to fuel oil delivery and more particularly to an apparatus and method for accurately monitoring, calculating and transmitting the actual quantity and quality of fuel oil delivered through a delivery pipe to a recipient, such as a residential or commercial building.

2. Description of Prior Art Including Information Disclosed Under 37 CFR 1.97 and 1.98

Fuel oil delivery records provided by the delivery company reflecting the quantity of fuel oil delivered to a recipient are not always accurate because the pumps used on fuel oil delivery trucks are not always accurate. Given the current high cost of fuel oil for heating residential and commercial buildings and for other purposes, such inaccuracies can be very costly to the home owner or business proprietor, particularly if they occur repeatedly over time.

The pumps on the fuel oil delivery trucks can be inaccurate for several reasons. Aside from the fact that the meter associated with the pumps may not be correctly calibrated, the oil pressure through the meter is designed for a specific flow rate and fluctuations in the flow rate may cause an inaccurate reading of the quantity of oil delivered. The temperature of the oil is also a factor because it affects the volume of the oil. Heat will cause fuel oil to expand and hence occupy more volume than the same amount of fuel oil at a lower temperature. Thus, the quantity of fuel oil recorded as delivered may be inflated if the temperature of the fuel oil is higher at the time it is delivered.

The viscosity of the oil being delivered is an indication of the purity of the oil. Impure oil will have a different viscosity than impure oil.

The dielectric property of the oil being delivered is also a function of the purity of the oil.

In addition, the density of the oil being delivered indicates whether and how much air is present in the oil. The more air that is present in the oil, the more the volume of the oil will increase, further distorting the accuracy of the delivery records.

Accordingly, there is a need for an apparatus and method which can accurately monitor and record the actual quantity and quality of fuel oil delivered to residential and commercial buildings by taking into account fluctuations in flow rate and temperature of the fuel oil at the time of delivery as well as the viscosity, density and dielectric property of the oil.

The components of the apparatus require power to operate. External power supplies providing 120 volt alternate current can create a danger of explosion when used in conjunction with fuel oil. Accordingly, there is a need for providing sufficient power to the apparatus in a manner which eliminates this danger.

It is therefore a primary object of the present invention to provide an apparatus and method for accurately monitoring and recording the quantity and quality of fuel oil delivered to a residential or commercial building.

It is another object of the present invention to provide an apparatus and method for accurately monitoring and recording the quantity of fuel oil delivered to a residential or commercial building, which takes into account the temperature of the fuel oil at the time the fuel oil is delivered.

It is another object of the present invention to provide an apparatus and method for accurately monitoring and recording the quantity of fuel oil delivered to a residential or commercial building, which takes into account fluctuations in the flow rate of the fuel oil at the time the fuel is delivered.

It is another object of the present invention to provide an apparatus and method for accurately monitoring and recording the quantity of fuel oil delivered to a residential or commercial building, which takes into account the density of the fuel oil as the fuel oil is being delivered.

It is another object of the present invention to provide an apparatus and method for accurately monitoring and recording the quality of fuel oil delivered to a residential or commercial building, which takes into account the viscosity of the fuel oil as the fuel oil is being delivered.

It is another object of the present invention to provide an apparatus and method for accurately monitoring and recording the quality of fuel oil delivered to a residential or commercial building, which takes into account the dielectric property of the fuel oil as the fuel oil is being delivered.

It is another object of the present invention to provide an apparatus and method for accurately monitoring and recording the amount of fuel oil delivered to a residential or commercial building which measures the volume of the fuel oil as the fuel oil is being delivered.

It is another object of the present invention to provide an apparatus and method for accurately monitoring and recording the quantity of fuel oil delivered to a residential or commercial building which uses the temperature, flow rate, density and volume of the fuel oil measured at the time the fuel oil is delivered to calculate the actual total quantity of fuel oil delivered.

It is another object of the present invention to provide an apparatus and method for accurately monitoring and recording the quantity of fuel oil delivered to a residential or commercial building which is capable of calculating and displaying the actual total quantity of fuel oil delivered and the date and time the fuel oil was delivered.

It is another object of the present invention to provide an apparatus and method for accurately monitoring and recording the quantity of fuel oil delivered to a residential or commercial building which is capable of generating an audible alarm if the temperature of the fuel oil being delivered exceeds a pre-set level.

It is another object of the present invention to provide an apparatus and method for accurately monitoring and recording the quantity of fuel oil delivered to a residential or commercial building which is capable of calculating and transmitting to a remote location the actual total quantity of fuel oil delivered and the date and time the fuel oil was delivered.

It is another object of the present invention to provide an apparatus and method for accurately monitoring and recording the quantity of fuel oil delivered to a residential or commercial building which is capable of calculating and transmitting to a remote location the actual total quantity of fuel oil delivered and the date and time the fuel oil was delivered by WiFi or mode.

It is another object of the present invention to provide an apparatus and method for accurately monitoring and recording the quantity of fuel oil delivered to a residential or commercial building which includes a generator driven by the fuel oil flow for providing low voltage to power the components of the apparatus.

BRIEF SUMMARY OF THE INVENTION

To those and to other objects which may hereinafter appear, one aspect of the present invention relates to apparatus for monitoring and recording the delivery of fuel oil through a fuel oil delivery pipe including means associated with the oil delivery pipe for measuring the temperature, flow rate, viscosity, density and dielectric property of the fuel oil as it moves through the pipe. The apparatus includes means for generating data signals with are a function of the measured parameters. Means are also provided for recording the data signals and for calculating the actual total quantity of fuel oil delivered through the pipe based upon the data signals.

Means are provided for recording the time that the temperature and flow rate parameters were measured and for generating a time signal which is a function thereof.

Means are provided for generating a transmission signal which is a function of the calculated actual total quantity of fuel oil delivered and the time signal.

Means are also provided for transmitting the transmission signal to a remote location. The transmitting means may include a WiFi transmitter or a modem for transmitting the transmission signals through the internet.

Means are also provided for generating an audible alarm if the temperature of the fuel oil being delivered exceeds a pre-set level.

Means are also provided for generating low voltage to power the apparatus components which is driven by the flow of fuel oil.

In accordance with another aspect of the present invention, a method is provided for monitoring the delivery of fuel oil through a fuel oil delivery pipe, the method includes the steps of measuring the temperature, flow rate, viscosity, density and dielectric property of the fuel oil as it moves through the delivery pipe, generating data signals which are a function of the measured parameters of the fuel oil, recording the data signals, and calculating the actual total quantity of fuel oil delivered through the pipe based upon the data signals.

The method includes the step of displaying the calculated actual total quantity of fuel oil delivered through the pipe.

The method includes the step of generating and displaying a time signal indicating the date and time that the temperature and flow rate of the fuel oil were measured.

The method further includes generating a transmission signal which is a function of the calculated actual total quantity of fuel oil delivered and time signal.

The method further includes transmitting the transmission signal to a remote location using a WiFi transmitter or sending the transmission signal to a remote location through the internet using a modem.

The method further includes generating an audible alarm if the temperature of the fuel oil being delivered exceeds a pre-set level.

The method further comprises generating low voltage to power the apparatus components using a generator driven by the flow of fuel oil.

BRIEF DESCRIPTION OF THE SEVERAL VIEWS OF DRAWINGS

To these and to such other objects that may hereinafter appears, the present invention relates to an apparatus and method for monitoring fuel oil delivery as described in detail in the following specification and recited in the annexed claims, taken together with the accompanying drawings, in which like numerals refer to like parts and in which:

DETAILED DESCRIPTION OF THE INVENTION

Figure 1:
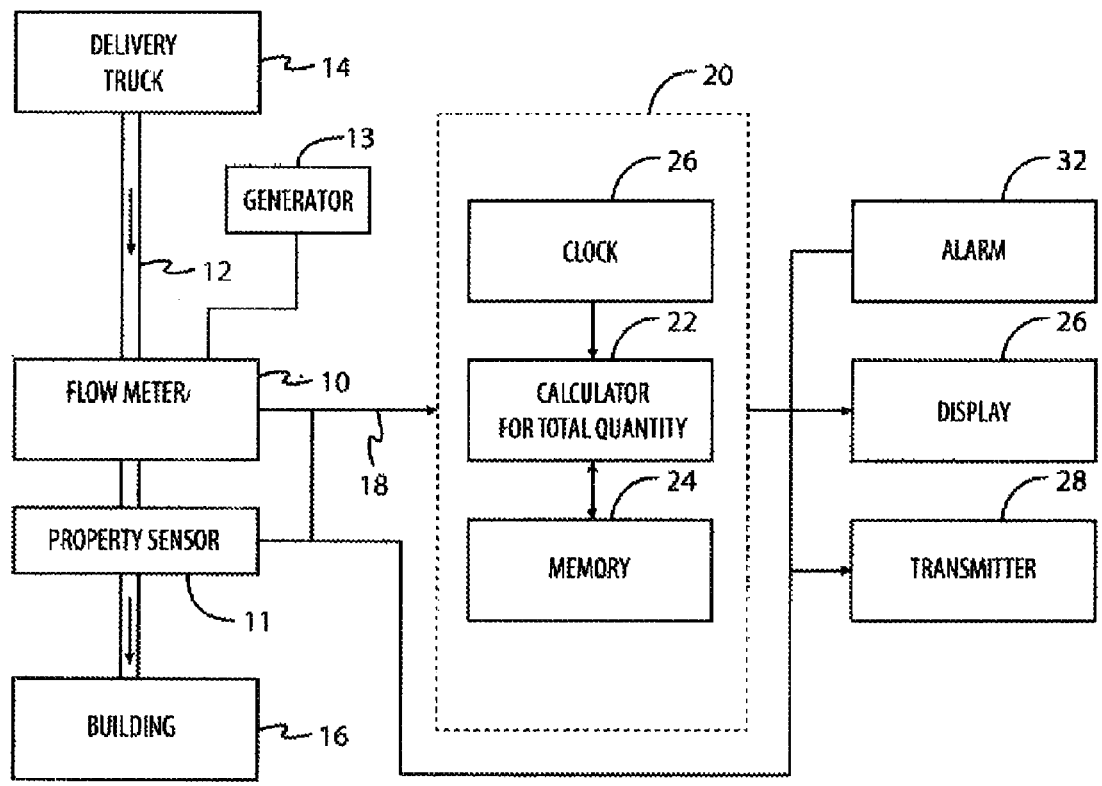
FIG. 1 is a block diagram of the apparatus of the present invention.

As seen in FIG. 1, the flow meter component 10 and the property sensor 11 are inserted into the delivery pipe 12 which extends between the fuel oil delivery truck 14 and the building 16 to which the fuel oil is to be delivered. Truck 14 has an associated pump which causes the fuel oil in the truck tank to flow through pipe 12 to a fuel storage tank within or proximate to building 16. Pipe 12 is customarily at least 2 inches in diameter such that the fuel oil can be transferred from the truck to the building in a relatively short time.

Flow meter component 10 may include a fuel or oil flow meter designed for use with a 2 inch pipe, such as Part No. 113900-9502, commercially available from Great Plains Industries of Santa Ana, Calif. The flow meter includes an internal wheel situated in the flow path which revolves. The number of revolutions per time interval provides a measurement of the flow rate of the fuel oil passing through pipe 12. The flow meter generates a digital data flow signal which is a function of the measured flow rate of the fuel oil as it passes through the meter.

A low voltage electric generator 13 is mechanically connected to flow meter 10 such that the rotation of the internal wheel of the flow meter drives the generator to provide a low voltage to power the components of the apparatus. Avoiding the use of a high voltage external source to power the apparatus components eliminates the danger of explosion resulting from a spark igniting fuel oil fumes.

Property sensor 11 includes a temperature sensor and a density measurement gauge. Property sensor 11 also includes a means for measuring the viscosity of the fuel oil and a detector for measuring the electrical properties of the fuel oil to determine the dielectric constant of the oil.

The property sensor 11 includes electronics which convert the sensed temperature and density measurement into a digital temperature data quantity signal and a digital density data quantity signal. The viscosity measurement and dielectric measurement are converted into digital viscosity and dielectric data purity signals.

The property sensor may take the form of Fluid Property Sensor FPS2800B 12C4 available from Measurement Specialties, Inc. of 105 av. du General Eisenhower BP 23705 31037 TOULOUSE CEDEX 1, France or the equivalent. That device is capable of directly and simultaneously measuring the viscosity, density, dielectric constant and temperature of the fuel oil as it flows through the sensor. The sensor monitors the direct and dynamic relationship between multiple physical properties to determine the quality, condition and contaminant loading of fluids such as fuel oil. It is a fully integrated, stand-alone module which combines sensor and processing electronics, including an on-board microprocessor for real-time data analysis.

The data flow signals from component 10 and the data quantity signals from property sensor 11 are transferred to the electronic circuit 20 of the apparatus through a wire or cable 18. Circuit 20 includes a calculator circuit 22, an electronic memory 24 and a clock or timer circuit 26. Circuit 20 calculates the actual total quantity of fuel oil which is delivered to the building taking into account the flow rate fluctuations, and the temperature and density measurements reflected in the data signals. The actual total quantity of fuel oil delivered may be displayed in numbers of gallons or liters.

The viscosity and dielectric data purity signals from property sensor 11 are compared to pre-determined values of viscosity and dielectric constant. If either or both of those data impurity signals deviate from pre-determined values by a given amount, a data impurity signal is generated on wire or cable 19.

A data impurity signal on wire or cable 19 would indicate that the fuel oil being delivered is not of sufficient quality. For example such an event could occur if the fuel oil has been mixed with used oil.

Circuit 20 also generates a time signal which represents the date and time that the fuel oil was delivered to the building. The time signal is based upon the output of an internal clock or timer circuit.

The data signals reflecting flow rate, temperature and density, the calculated actual total quantity delivered and the time signal are stored in memory 24. Some or all of those signals can also be displayed on an LCD display 26 so that they can be observed at the site of apparatus and/or sent to a transmitter 28 for forwarding to a remote location for display and/or recording.

The data impurity signal on wire or cable 19 is transferred directly an alarm 32, display 26 and transmitter 28 to alert the recipient of the fuel oil immediately that there may be an issue with the purity of the fuel oil being delivered.

The apparatus can be programmed to display and/or transmit various parameters including current flow rate in gallons (or liters), the temperature of the fuel oil, the type of fuel oil (gasoline or diesel) and the calculated actual total quantity of fuel oil delivered in gallons (or liters).

Transmitter 28 could take the form a WiFi transmitter for wireless communication. It could also take the form of an internet-connected computer with a modem for communication over the internet.

An alarm circuit 32 connected to property sensor 11 and circuit 20 is actuated to generate an audible alarm signal when the quality of the fuel oil being delivered is unacceptable or the temperature sensed by the temperature sensor exceeds a pre-set level. The level at which the alarm will be actuated can be adjusted. The alarm will provide a real time notification if the quality of the fuel oil being delivered is below a pre-set standard or the temperature of the fuel oil being delivered is too high. In indication that the alarm has been actuated will be stored in memory 24.

Figure 2:
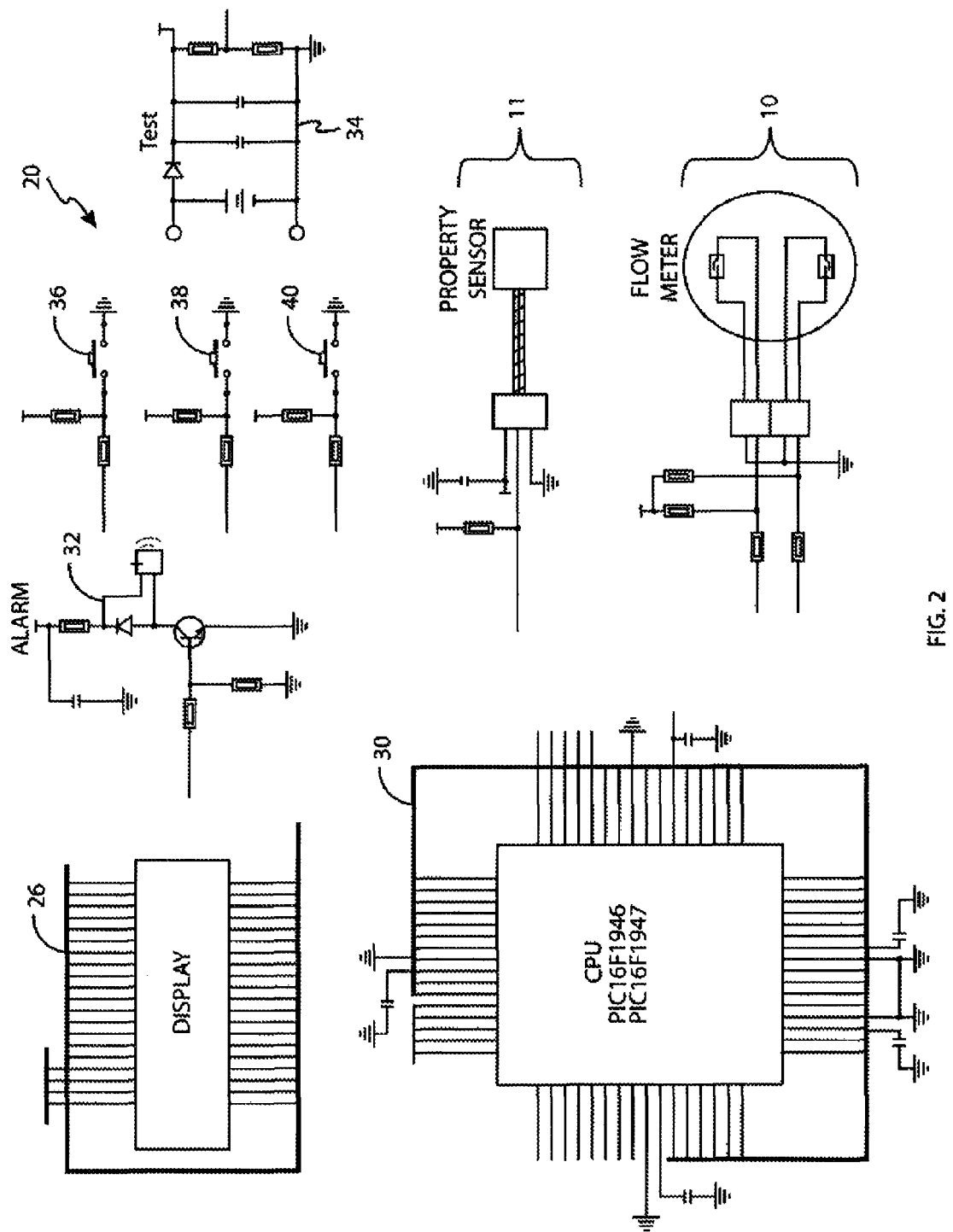
FIG. 2 is a schematic diagram of the circuit of the present invention.

FIG. 2 illustrates some of the basic sub-circuits which form circuit 20 and are connected to receive the output of the flow meter 10 and property sensor 11. Those sub-circuits include a LCD display 26 and a CPU 30 which controls the overall function of the apparatus and forms the calculated actual total quantity of fuel oil delivered based on the data signals.

CPU 30 may be a 64-pin, flash based, 8 bit CMOS microcontroller with a LCD driver such as is commercially available from Microchip Technology Inc. of Chandler, Ariz. as Part no. PIC16f1946/PIC16f1947.

The calculated actual total quantity of fuel oil delivered is formed in the CPU by multiplying the coefficient of cubical or thermal expansion of the particular fuel being delivered per temperature degree times a factor based up the number of revolutions of the internal wheel of the flow meter per time resulting from the fluid flow. For example, the expansion factor for diesel fuel is 0.0008/c degree and the flow rate factor is 0.0747L for a pipe of 2 inch diameter.

Memory 24 is programmed to store the expansion factors for a variety of common liquid fuels. The type of fuel being delivered is also entered into the apparatus. Circuit 20 uses that information and the measured temperature of the fuel at the time it is delivered to form the calculated actual total quantity of the fuel delivered.

An output of CPU 30 is connected to a driver circuitry for a alarm 32 which creates an audible signal if the quality is unacceptable or the sensed temperature exceeds a given level. The level at which the alarm is actuated can be adjusted. An indication that the alarm has been actuated is stored in memory 24. A test circuit 34 and three programming switches 36, 38 and 40 are also connected to CPU 30.

Figure 3:
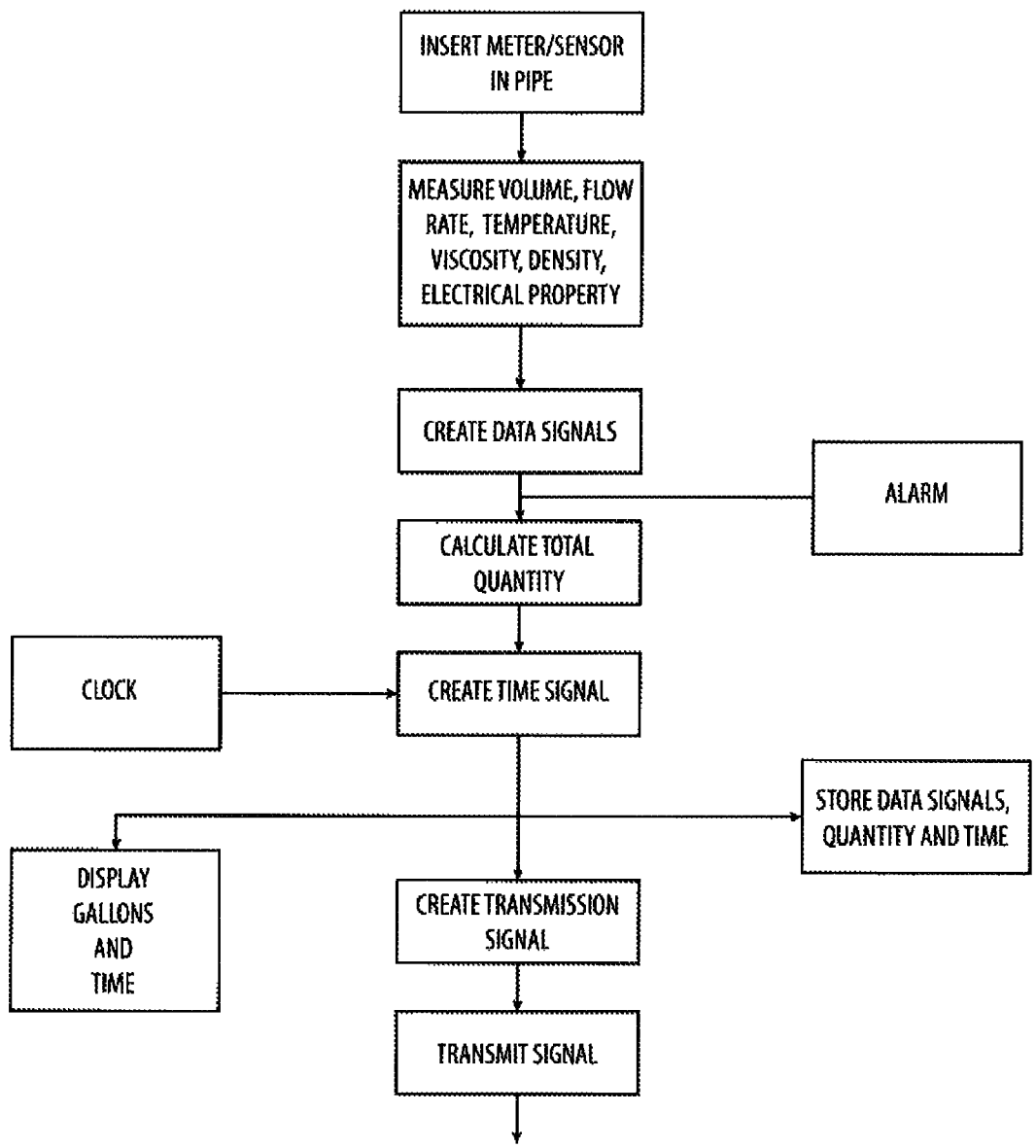
FIG. 3 is a flow chart of the steps of the method of the present invention.

FIG. 3 is a flow chart of the steps of the method of the present invention. After the flow meter and property sensor are inserted into the delivery pipe and circuit is initialized, the flow rate, temperature, viscosity, density and dielectric constant of the fuel oil passing through the pipe are measured and the data signals are created. The CPU receives the data quantity signals and calculates the actual total quantity of fuel oil delivered in gallons or liters. The time signal is created in accordance with the output of the clock to reflect the date and time at which the parameters were measured.

The calculated actual total quantity delivered and time signal are displayed by the LCD display and stored in the memory. A transmission signal may be created based on the calculated actual total quantity delivered and the time signal. The transmission signal may then be sent to a remote location, if desired. The transmission may be accomplish using a wireless connection, such a WiFi, or through the internet using an internet-connected computer and a modem.

In the event that the quality of the fuel oil is unacceptable or the temperature which exceeds a pre-set level is sensed, an alarm is actuated to generate an audible signal indicating an unacceptable quality or a high temperature condition. The actuation of the alarm is stored in memory for future reference.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

We claim:

1. Apparatus for monitoring the delivery of fuel oil through a fuel oil delivery pipe comprising a flow meter associated with the fuel oil delivery pipe comprising a rotatable wheel rotated by the fuel oil flow for measuring the flow rate of the fuel oil in the fuel oil delivery pipe and for generating data flow signals which are a function of the measured flow rate, and a property sensor for measuring the properties of the fuel oil as it moves through the fuel oil delivery pipe and for generating data property signals which are a function of the measured fuel oil properties, a memory for recording the data flow signals and data property signals, a calculating circuit for calculating the actual total quantity of fuel oil delivered through the pipe based upon the data flow signals and the data property signals, and an electric generator mechanically connected to said flow meter wheel to drive the generator to provide power to said memory and said calculating circuit.

2. The apparatus of claim 1 wherein said property sensor measures the temperature of the fuel oil.

3. The apparatus of claim 1 wherein said property sensor measures the viscosity of the fuel oil.

4. The apparatus of claim 1 wherein said property sensor measures the density of the fuel oil.

5. The apparatus of claim 1 wherein said property sensor the dielectric constant of the fuel oil.

6. The apparatus of claim 1 wherein said memory records the calculated actual total quantity of fuel oil delivered through the pipe.

7. The apparatus of claim 1 further comprising an alarm for generating an audible signal when the property measurements indicate that the purity of the fuel oil is below a pre-determined level.

8. The apparatus of claim 1 wherein said generator provides a low voltage output.

9. A method for monitoring the delivery of fuel oil through a fuel oil delivery pipe using a flow meter with a wheel rotated by fuel oil flow, a property sensor, a memory, a calculation circuit and a generator, the method comprising the steps of:

(a) positioning the wheel of the flow meter in the fuel oil flow to measure the flow rate of the fuel oil as it flows through the delivery pipe and to generate a data flow signal which is a function of the measured flow rate;

(b) measuring the properties of the fuel oil as it moves through the delivery pipe with the property sensor and generating a data property signal which is a function of the measured fuel oil properties, (c) recording the data flow signals and the data property signals in the memory, (d) calculating the actual total quantity of fuel oil delivered through the pipe in the calculating circuit based upon the data flow signals and the data property signals; and (e) connecting the wheel of the flow meter to drive the generator to provide power to the memory and the calculating circuit.

10. The method of claim 9 wherein the step of measuring the properties of the fuel oil comprises the step of measuring the temperature of the fuel oil.

11. The method of claim 9 wherein the step of measuring the properties of the fuel oil comprises the step of measuring the viscosity of the fuel oil.

12. The method of claim 9 wherein the step of measuring the properties of the fuel oil comprises the step of measuring the density of the fuel oil.

13. The method of claim 9 wherein the step of measuring the properties of the fuel oil comprises the step of measuring the dielectric constant of the fuel oil.

14. The method of claim 9 further comprising the step of recording the calculated actual total quantity of fuel oil delivered through the pipe.

15. The method of claim 9 further comprising the step of generating an audible signal when the property measurements indicate that the purity of the fuel oil is below a pre-determined level.

16. The method of claim 9 wherein the generator provides a low voltage power.

* * * * *